Jan. 1, 1963        D. P. LOWER ET AL        3,071,419
BEARING OR THE LIKE
Filed May 13, 1960
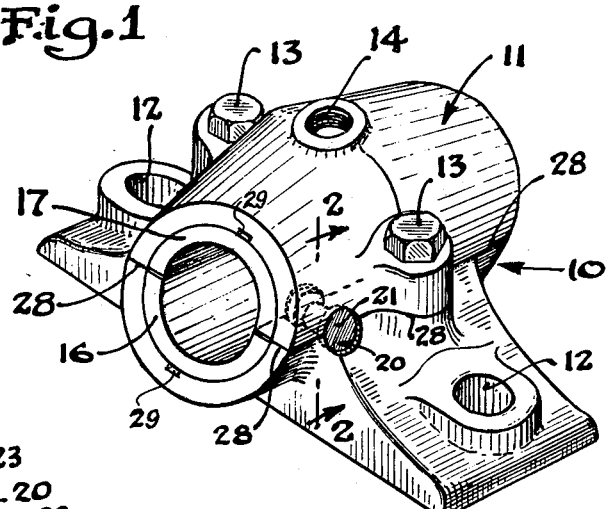
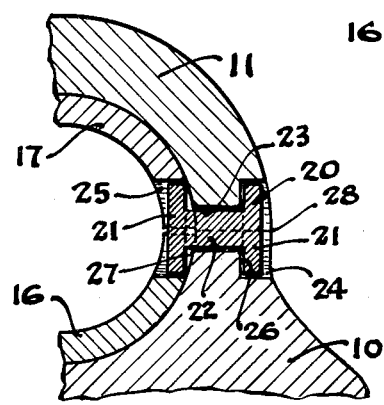
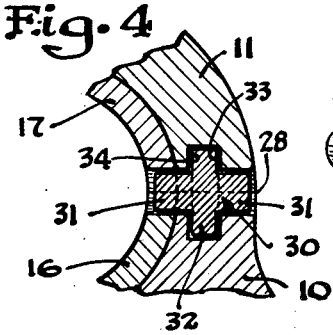
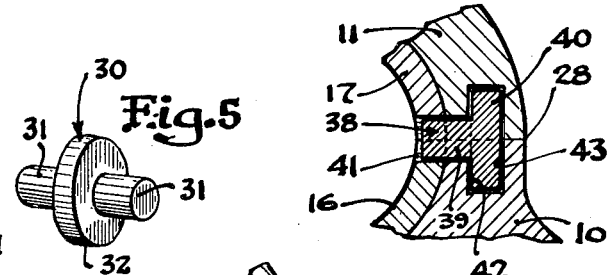
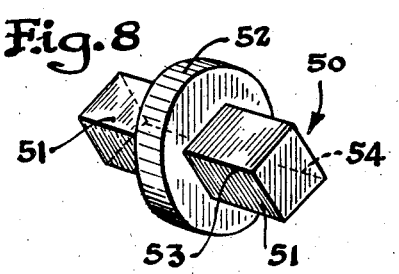
Inventors
Donald P. Lower
Lorrain E. Melser
By Jones, Darbo & Robertson
Attorneys

United States Patent Office 3,071,419
Patented Jan. 1, 1963

3,071,419
BEARING OR THE LIKE
Donald P. Lower, Mishawaka, and Lorrain E. Melser, Elkhart, Ind., assignors to Dodge Manufacturing Corporation, Mishawaka, Ind., a corporation of Indiana
Filed May 13, 1960, Ser. No. 28,975
10 Claims. (Cl. 308—74)

The present invention relates to a bearing, or the like, of the type known as a split, bushed, bearing. In such devices, there is a split housing within which a split, cylindrical, liner is received. In a bearing, it is this liner that defines the supporting surface for the journal of a shaft.

Various means have been employed in the past for holding the bearing liner in the housing, but these all have one or more disadvantages. In some the bearing must be completely removed from the shaft in order to permit the separation of the liner from the housing. Another fault is that the fastening means become frozen or stuck making it difficult to remove. One of the best of prior devices reduced the metal available for threads for the screw used for fastening the two halves together. Some constructions are objectionably expensive to manufacture or assemble. The principal object of our invention is to provide an economical construction whereby the bearing liner is securely held in the housing yet which greatly simplifies the process of original assembly, removing worn bearing liners and the replacing with new liners.

With our invention, worn bearing liners may be replaced by unfastening the means holding the two halves of the bearing housing together, that means usually being a pair of bolts. When one half of the bearing housing and liner are separated from the other half, the dowel structure of this invention may be just lifted out. A slight displacement of the shaft from the other half of the bearing liner permits the liner to be loosened (as by prying) and then turned and removed. The same steps are then performed in the reverse order to replace new liners within the housing.

The foregoing operations in replacing worn liners are extremely simple and it will be readily apparent that they offer advantages, particularly in the replacing of liners on pillow blocks which are permanently attached to a mounting to rotatably support a shaft. The shaft need not be removed from the pillow block, for once the top half of the housing has been removed, it only is necessary to raise the shaft a few thousandths of an inch to permit the lower liner to be rotated out of the bottom half of the pillow block. It will be appreciated that with an extremely large shaft, or with a shaft which may be carrying various items of apparatus which it is disadvantageous to separate from the shaft, the ability to rplace the liner by only raising the shaft a few thousandths of an inch is most resirable.

Another advantage of our invention is that it adds so little to the cost of a bearing that the overall cost is about as low as the cost of the same bearing with any of the conventional means for holding the liner properly positioned in the bearing housing. Compared to some, it actually will be cheaper to produce a bearing incorporating our invention. The common practice of securing liners in place with countersunk screws or dowels requires rough boring prior to assembly in housing and finish boring after, a very costly manufacturing procedure. Assembly of the bearing of the present invention is relatively easy. For example, the preferred dowels tend to align the screw holes.

Other objects and advantages will become apparent from the following description taken in conjunction with the drawings in which:

FIGURE 1 is a perspective view of a pillow block embodying a preferred form of our invention;
FIGURE 2 is a partial section as viewed at line 2—2 of FIGURE 1;
FIGURE 3 is a perspective view of the dowel used in the embodiment of FIGURE 1;
FIGURE 4 is a partial section corresponding to FIGURE 2 illustrating the use of an alternative form of dowel;
FIGURE 5 is a perspective view of the dowel employed in the embodiment of FIGURE 4;
FIGURE 6 is a partial section corresponding to FIGURE 2 showing the use of an alternative form of dowel;
FIGURE 7 is a partial section corresponding to FIGURE 2 illustrating a still further alternative form of dowel; and
FIGURE 8 is a perspective view of another alternative form of dowel.

FIGURES 1–3 are illustrative of an embodiment of our invention as utilized in a pillow block. From the following description it will be apparent that the invention is equally applicable to other types of lined, split, bearings and may be applied to other devices having a split housing with a split liner therein.

The pillow block of FIGURE 1 comprises a housing having a base half 10 and a top half 11. The base half of the housing is provided with openings 12 for the mounting of the bearing. The two halves of the housing are connected by bolts 13 which extend through openings in top half 11 and are threaded in to tapped openings in base half 10. The threaded opening 14 on the top of housing half 11 is to receive a suitable means for supplying a lubricant to the bearing as is conventional in this art.

Within the housing is a split bearing liner formed of a base half 16 and a top half 17. Such liners are usually of a bronze bearing material. However, the particular material employed is not a part of our invention and it may be of any desired lining material. The bearing liner is cylindrical both inside and out and is received in a cylindrical opening in the housing. The axes of each of these cylindrical shapes are coincident. They fall in a parting plane which can be visualized by the line 28 which is the line of demarcation between the top halves and the bottom halves. Each liner is turned to a size a few thousandths of an inch oversize, inside and out, so that its halves fit the housing halves with a light press fit and are then the right size.

The liner is fixed in position within the housing by a dowel generally 20, which in the embodiment of FIGURES 1–3 is generally spool shaped. The dowel has a pair of enlarged cylindrical ends 21 connected by a smaller cylindrical neck 22. As best seen in FIGURE 2, neck 22 is received in a cylindrical opening 23 in the housing which opening is only slightly larger than the neck 22. Ends 21 are respectively received in a cylindrical opening 24 in the housing and an opening 25 in the liner. Each of openings 23–25 are circular about an axis that lies in the plane of parting line 28 between the upper and lower halves of the housing and liner. Thus dowel 20 is half in the lower portion of the housing and liner, and half in the upper portion of the housing and liner.

Opening 24 and opening 25 define opposed faces 26 and 27 respectively in the housing. It is against these faces that the enlarged ends 21 of the dowel 20 abut to prevent any axial movement of the dowel in the housing or liner. In this respect it might be mentioned that in the drawings double lines have been used showing the dowel in its opening in the housing and liner. Of necessity these lines have been spaced so as not to appear as a single wide line. In actual practice the dowels of our invention will be made to fit snugly, without binding, in the openings in the housing and liner.

To replace the liner in the pillow block of FIGURE 1, bolts 13 are removed, thus permitting top housing half 11 and top liner half 17 to be lifted from the shaft (not shown) that is in the bearing. Dowel 20 now may be lifted from the opening within which it rests in the lower housing half 10 and the lower liner half 16. The shaft now may be removed from the lower liner half 16, or raised just slightly to permit the lower liner half 16 to be removed from the lower housing 10 by loosening it and rotating it 180° around the shaft. Small key slots or notches 29 are preferably provided for facilitating the loosening of the liner halves.

A new lower liner half 16 is replaced and dowel 20 returned to the position illustrated in FIGURES 1 and 2. Thereafter, the top housing half 11, fitted with a new top liner half 17 is placed over the shaft (correct positioning being facilitated and ensured by dowel 20) and fastened down by bolts 13.

The number of dowels 20 that are employed in a particular assembly will usually depend upon the type of sleeve. In the type illustrated in FIGURE 1, where a gap formed by a saw cut is left between liner halves, two dowels usually would be used. One of these is illustrated in FIGURE 1. The other would appear opposite the one illustrated, either directly opposite or diagonally opposite. By diagonally opposite is meant the position behind opening 14 as the pillow block is viewed in FIGURE 1. With no gap between liner halves, one dowel is enough.

FIGURES 4 and 5 illustrate an alternative form of a dowel 30 employed to secure the two liner halves 16 and 17 to the two housing halves 10 and 11. In this embodiment, the dowel has a pair of small cylindrical ends 31 and a large cylindrical center portion 32. The dowel is positioned within a correspondingly shaped recess in the housing and liner with the axis of the recess corresponding with the parting line 28 between the halves of the housing and liner. The large central portion of the opening in the housing defines a pair of opposed faces 23 and 24 against which the sides of the enlarged center portion 32 of the dowel abut to affix the position of the dowel within the housing.

In the embodiment of FIGURE 6, a dowel generally 38 having a small cylindrical neck 39 and a large cylindrical head 40 is employed. A correspondingly shaped opening 41 centered about parting line 28 receives the dowel 38. Opposed faces 42 and 43 of the housing abut against opposite sides of head 40 of the dowel to hold the dowel in place.

FIGURE 7 illustrates a dowel generally 46 having the shape of two truncated cones positioned base to base. The opening within the housing and liner is of a corresponding shape and defines a pair of opposed conical faces 47 and 48 which abut the conical surfaces of dowel 46. The opening defining faces 47 and 48 is symmetrical about parting line 28. When the top half 11 of the housing is bolted to the bottom half 10, dowel 46 is prevented from moving axially with respect thereto. However, when the top half 10 is removed, dowel 46 may be easily lifted out.

All of the embodiments of FIGURES 1-7 describe the use of dowels which are in the form of a solid of revolution. For the purposes of this application, that term is used to define the outer surface of the dowel even though the dowel might be constructed with an opening therein.

While a dowel having the form of a solid of revolution has substantial advantages in the manufacture of bearing structures incorporating our invention, it is not necessary in order to obtain many of the advantages of our invention to have the dowel in the form of a solid revolution. Thus, for example, FIGURE 8 illustrates a dowel generally 50 having a pair of small rectangular ends 51 connected by a larger cylindrical portion 52. A correspondingly shaped opening would be provided in the housing and liner.

When installed, the dowel 50 would have the same cross-sectional appearance as that of dowel 30 in FIGURE 4. The sides of the enlarged cylindrical portion would abut the opposed faces 33 and 34 of the cylindrical central portion of the opening in the housing. The smaller portions of the opening in the housing and liner would be rectangular in cross-section and formed so that edges 53 and 54 of the dowel lie in the same plane as parting line 28. Thus, when the top half 11 of the housing and the top half 17 of the liner were lifted away from the bottom halves, the dowel 50 could be picked up from the opening within which it rests.

Like the dowels of FIGURES 3, 5, 6 and 7, the dowel of FIGURE 8 has its greatest width positioned to coincide with parting line 28, and converges upwardly above this line. This permits easy separation of the dowel from either half of the housing and from either half of the liner, and provides a self-centering action in restoring the top half 11 of the housing. Each of the dowels has an enlarged means thereon, which abuts opposing faces of the housing to hold the dowel in place and, of course, each of the dowels has one portion that extends into the cylinder of the assembled liner to hold the liner in place in the housing. In this respect it might be mentioned that in the drawings the two halves of the liner, 16 and 17, are shown abutting each other. In some embodiments, the two halves of the liner rather than being in abutment might be separated from each other a short distance, as for example, the width of a saw cut, as in FIG. 4.

An important advantage of the FIG. 1 form of the invention over the other forms is the ease with which the pillow block or housing can be manufactured. Its recess for the dowel can be cut, without removing the top 11, by a drilling (or rotary cutting) operation along a single path, namely the axis of the recess. This follows from the fact that the recess surface is a surface of revolution about that axis, free from any enlargement enclosed within (or subtended by) a wall. All of the other illustrated forms require separating the top 11, and performing another cutting operation on each of the separated parts, as would at least one prior art form. Some forms of the invention not illustrated would also have this advantage of being formed by a drilling action on one line only, without removal of the top. As compared to at least some of these, the FIGURE 1 form is preferred because, having no inward enlargement of the opening, the drilling operation can be performed from the outside. If desired, it can be performed by a single operation using a stepped drill and milling tool.

The liners are formed separately and their part of the dowel recess is also easily formed by drilling. Usually these liners are precision turned as sleeves, internally for the bearing and externally to press-fit the housing, and cut in two. Thus the drilling can be accomplished for both halves of the liner before cutting apart by one pass centered on the line to be cut.

Although the foregoing disclosure offered for public dissemination is detailed to insure adequacy and aid understanding, this is not intended to prejudice that purpose of a patent, which is to cover each new inventive concept therein, no matter how others may later disguise it by variations in form or additions or other improvements. The following claims are intended as the chief aim toward this purpose, as it is these that meet the requirement of pointing out the parts, improvement, or combinations in which the inventive concepts are found.

We claim:

1. An article of manufacture: a housing having a cylindrical opening therethrough formed about an axis, a cylindrical bearing liner received in said opening, said housing and liner each being divided into two parts with the faces of division extending parallel to the axis and on diametrically opposite sides of said axis, means interconnecting the two halves of said housing to releasably affix the two halves to each other, and a dowel having a longitudinal axis and positioned between the two halves of the housing and liner with the dowel axis lying in one of said faces of division, said housing and liner having a recess to receive said dowel, the recess defining opposed faces contacted by said dowel to limit movement of said dowel along its axis with respect to said housing, said dowel holding said liner in place in said housing and said liner being removable upon releasing said interconnecting means, separating said halves and removing the dowel exposed by the separation of said halves, the periphery of said dowel being a solid of revolution, and the surface of the recess forming a surface of revolution having its axis on the face of division, the portion of the recess in the housing being free from any enlargements enclosed within a wall thereof whereby it may be formed by rotary cutting with the parts of the housing together.

2. An article of manufacture: a housing having a cylindrical opening therethrough formed about an axis, a cylindrical bearing liner received in said opening, said housing and liner each being devided into two parts with the faces of division extending parallel to the axis and on diametrically opposite sides of said axis, means interconnecting the two halves of said housing to releasably affix the two halves to each other, and a dowel having a longitudinal axis and positioned between the two halves of the housing and liner with the dowel axis lying in one of said faces of division, said housing and liner having a recess to receive said dowel, the recess defining opposed faces contacted by said dowel to limit movement of said dowel along its axis with respect to said housing, said dowel holding said liner in place in said housing and said liner being removable upon releasing said interconnecting means, separating said halves and removing the dowel exposed by the separation of said halves, the periphery of said dowel being a solid of revolution, and the surface of the recess forming a surface of revolution having its axis on the face of division, the portion of the recess in the housing being free from any enlargements facing inwardly within a wall thereof whereby it may be formed by rotary cutting with the parts of the housing together.

3. An article of manufacture: a housing having a cylindrical opening therethrough formed about an axis, a cylindrical bearing liner received in said opening, said housing and liner each being divided into two parts with the faces of division extending parallel to the axis and on diametrically opposite sides of said axis, means interconnecting the two halves of said housing to releasably affix the two halves to each other, and a dowel having a longitudinal axis and positioned between the two halves of the housing and liner with the dowel axis lying in one of said faces of division, said housing and liner having a recess to receive said dowel, said dowel holding said liner in place in said housing and said liner being removable upon releasing said interconnecting means, separating said halves and removing the dowel exposed by the separation of said halves, the periphery of said dowel being a solid of revolution, enlarged at both ends, and the surface of the recess forming a surface of revolution having its axis on the face of division, the portion of the recess in the housing being free from any enlargements enclosed within a wall thereof whereby it may be formed by rotary cutting with the parts of the housing together, the wall of the housing extending between the enlarged ends of the dowel to hold it in place.

4. An article of manufacture: a housing having a cylindrical opening therethrough formed about an axis, a cylindrical bearing liner received in said opening, said housing and liner each being divided into two parts with the faces of division extending parallel to the axis and on diametrically opposite sides of said axis, means interconnecting the two halves of said housing to releasably affix the two halves to each other, and a dowel having a longitudinal axis and positioned between the two halves of the housing and liner with the dowel axis lying in one of said faces of division, said housing and liner having a recess to receive said dowel, the recess defining opposed faces contacted by said dowel to limit movement of said dowel along its axis with respect to said housing, said dowel holding said liner in place in said housing and said liner being removable upon releasing said interconnecting means, separating said halves and removing the dowel exposed by the separation of said halves.

5. An article of manufacture: a housing having a cylindrical opening therethrough formed about an axis, a cylindrical bearing liner received in said opening, said housing and liner each being divided into two halves along an axial plane, means interconnecting the two halves of said housing to releasably affix the two halves to each other, and a dowel having enlarged means thereon, said dowel being in the form of a solid of revolution about a longitudinal axis and being positioned between the two halves of the housing and liner with the dowel axis in said plane and normal to the axis of the opening, said housing and liner having a recess to receive said dowel, the recess defining opposed faces contacted by said enlarged means to limit movement of said dowel along its axis with respect to said housing, said dowel holding said liner in place in said housing and said liner being removable upon releasing said interconnecting means, separating said halves and removing the dowel exposed by the separation of said halves.

6. An article of manufacture: a housing having a cylindrical opening therethrough formed about an axis, a cylindrical bearing liner received in said opening, said housing and liner each being divided into two halves along an axial plane, means interconnecting the two halves of said housing to releasably affix the two halves to each other, and a dowel having enlarged means thereon, said dowel being positioned between the two halves of the housing and liner with the dowel axis in said plane and normal to the axis of the opening, and being widest in said plane and converging upwardly above said plane to provide a centering action as the upper housing half is applied, said housing and liner having a recess to receive said dowel, the recess defining opposed faces contacted by said enlarged means to limit movement of said dowel along its axis with respect to said housing, said dowel holding said liner in place in said housing and said liner being removable upon releasing said interconnecting means, separating said halves and removing the dowel exposed by the separation of said halves.

7. An article of manufacture: a housing having a cylindrical opening therethrough formed about an axis, a cylindrical bearing liner received in said opening, said housing and liner each being divided into two halves along an axial plane, each liner half fitting its housing half with a press fit and each housing half having a small opening near the middle of an end face to receive a tool for prying loose the liner, means interconnecting the two halves of said housing to releasably affix the two halves to each other, and a dowel having enlarged means thereon, said dowel being in the form of a solid of revolution between a longitudinal axis and being positioned between the two halves of the housing and liner with the dowel axis in said plane and normal to the axis of the opening, said housing and liner having a recess to receive said dowel, the recess defining opposed faces contacted by said enlarged means to limit movement of said dowel along its axis with respect to said housing, said dowel locking said liner in place in said housing and said liner being removable upon releasing said interconnecting means, separating said halves and removing the dowel exposed by the separation of said halves, the dowel when thus exposed being removable by lifting it out transversely of its axis.

8. An article of manufacture: a housing having a cylindrical opening therethrough formed about an axis, a cylindrical bearing liner received in said opening, said housing and liner each being divided into two halves along an axial plane, each liner half fitting its housing half with a press fit, means interconnecting the two halves of said housing to releasably affix the two halves to each other, and a dowel having enlarged means thereon, said dowel being in the form of a solid of revolution between a longitudinal axis and being positioned between the two halves of the housing and liner with the dowel axis in said plane and normal to the axis of the opening, said housing and liner having a recess to receive said dowel, the recess defining opposed faces contacted by said enlarged means to limit movement of said dowel along its axis with respect to said housing, said dowel locking said liner in place in said housing and said liner being removable upon releasing said interconnecting means, separating said halves and removing the dowel exposed by the separation of said halves.

9. An article of manufacture: a housing having a cylindrical opening therethrough formed about an axis, a cylindrical bearing liner received in said opening, said housing and liner each being divided into two halves along an axial plane, means interconnecting the two halves of said housing to releasably affix the two halves to each other, and a dowel having enlarged means thereon, said dowel being positioned between the two halves of the housing and liner with the dowel axis in said plane and normal to the axis of the opening, and being widest in said plane and converging upwardly above said plane to provide a centering action as the upper housing half is applied, said housing and liner having a recess to receive said dowel, the recess defining opposed faces contacted by said enlarged means to limit movement of said dowel along its axis with respect to said housing, said dowel holding both halves of said liner in place in said housing and said liner being removable upon releasing said interconnecting means, separating said halves and removing the dowel exposed by the separation of said halves; the dowel when thus exposed being removable by simply lifting it out transversely of its axis, and being oppositely movable as the halves are moved together, to properly position a liner which is circumferentially displaced.

10. An article of manufacture: a housing having a cylindrical opening therethrough formed about an axis, a cylindrical bearing liner received in said opening naturally of larger diameter than the opening but by its insertion therein, sprung to conform to the size of the opening, said housing and liner each being divided into two halves along an axial plane, means interconnecting the two halves of said housing to releasably affix the two halves to each other, and a dowel having enlarged means thereon, said dowel being positioned between the two halves of the housing and liner with the dowel axis in said plane and normal to the axis of the opening, and being widest in said plane and converging upwardly above said plane to provide a centering action as the upper housing half is applied, said housing and liner having a recess shaped uniformly through it to receive said dowel, the recess defining opposed faces contacted by said enlarged means to limit movement of said dowel along its axis with respect to said housing, said dowel holding both halves of said liner in place in said housing and said liner being removable upon releasing said interconnecting means, separating said halves and removing the dowel exposed by the separation of said halves.

References Cited in the file of this patent

UNITED STATES PATENTS

| 1,158,436 | Bowen | Nov. 2, 1915 |
| 1,299,357 | Kuettner | Apr. 1, 1919 |

FOREIGN PATENTS

| 842,142 | Germany | June 23, 1952 |
| 146,328 | Sweden | July 27, 1954 |